(12) United States Patent
Schubert

(10) Patent No.: US 7,512,461 B2
(45) Date of Patent: Mar. 31, 2009

(54) VEHICLE ROLLOVER SENSING USING ANGULAR ACCELEROMETER

(75) Inventor: Peter J. Schubert, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 1188 days.

(21) Appl. No.: 10/722,706

(22) Filed: Nov. 25, 2003

(65) Prior Publication Data

US 2005/0113983 A1 May 26, 2005

(51) Int. Cl.
*G05D 1/00* (2006.01)

(52) U.S. Cl. .............................. 701/1; 701/70; 180/271; 180/282; 340/440; 280/734; 280/735

(58) Field of Classification Search ...................... 701/1, 701/36, 37, 38, 39, 45, 46, 49; 180/282; 280/734, 735; 340/440
See application file for complete search history.

(56) References Cited

U.S. PATENT DOCUMENTS

| | | | | |
|---|---|---|---|---|
| 4,361,040 A | 11/1982 | Taplin et al. | .................. | 73/503 |
| 5,602,734 A | 2/1997 | Kithil | .......................... | 364/424 |
| 5,610,575 A | 3/1997 | Gioutsos | ...................... | 340/429 |
| 5,825,284 A | 10/1998 | Dunwoody et al. | ......... | 340/440 |
| 5,890,084 A | 3/1999 | Halasz et al. | .................. | 701/45 |
| 6,002,974 A | 12/1999 | Schiffmann | ................... | 701/36 |
| 6,002,975 A | 12/1999 | Schiffmann et al. | ........... | 701/36 |
| 6,038,495 A | 3/2000 | Schiffmann | ..................... | 701/1 |
| 6,192,305 B1 * | 2/2001 | Schiffmann | .................. | 701/45 |
| 6,204,499 B1 | 3/2001 | Schaefer | ...................... | 250/231 |
| 2004/0039509 A1 * | 2/2004 | Breed | .......................... | 701/45 |

FOREIGN PATENT DOCUMENTS

| | | |
|---|---|---|
| DE | 19606043 | 8/1997 |
| DE | 19609176 | 9/1997 |
| EP | 0306003 | 1/1992 |
| WO | WO9947384 | 9/1999 |

* cited by examiner

*Primary Examiner*—Gertrude Arthur Jeanglaud
(74) *Attorney, Agent, or Firm*—Jimmy L. Funke

(57) ABSTRACT

A vehicle rollover sensing apparatus and method are provided for predicting a future roll angle and an overturn condition of a vehicle. The apparatus includes an angular accelerometer for sensing angular acceleration of the vehicle and producing an output signal indicative thereof. A first integrator integrates the sensed angular acceleration signal and produces an angular rate. A second integrator integrates the angular rate and generates a current roll angle. A predictor predicts a future roll angle as a function of the sensed angular acceleration, angular rate, and current roll angle. A comparator compares the predicted future roll angle to a threshold value. The apparatus generates a vehicle overturn condition signal based on said comparison, and signals deployment of restraint devices.

31 Claims, 5 Drawing Sheets

VEHICLE ROLLOVER SENSING USING ANGULAR ACCELEROMETER

TECHNICAL FIELD

The present invention generally relates to rollover sensors and, more particularly, to cost affordable vehicle roll angle sensing and predicting an overturn condition of a vehicle.

BACKGROUND OF THE INVENTION

Automotive vehicles are increasingly equipped with on-board restraint devices that deploy in the event that the vehicle rolls over in an attempt to provide added protection to occupants of the vehicle. For example, a pop-up roll bar can be deployed to extend vertically outward to increase the height of support provided by the roll bar, upon detecting an anticipated vehicle rollover condition. Additionally, many vehicles are typically equipped with multiple air bags, side curtains, and seatbelt pretensioners. These restraint devices require timely deployment to mitigate adverse effects to occupants in the vehicle. To achieve timely deployment of restraint devices, the dynamic motion of the vehicle must be determined and a decision must be made to determine whether a vehicle rollover is anticipated.

Various single sensor and multiple sensor modules have been employed in vehicles to sense the static and dynamic conditions of the vehicle. For example, tilt switches, tilt sensors, angular rate sensors, and linear accelerometers have been employed. One sophisticated rollover sensing approach employs up to six sensors including three accelerometers and three angular rate sensors (gyros) which are employed together for use in an inertial navigation system to track position and attitude of the vehicle. The sophisticated multiple sensor techniques generally employ discrimination algorithms implemented in a controller to process the sensed information and determine the potential for a vehicle overturn condition.

While various rollover sensing approaches have served well for anticipating some vehicle rollovers, there still exist certain rollover scenarios that are challenging to predict. In particular, several restraint devices have deployment decision times that require an early advance determination of an anticipated vehicle rollover. For example, a vehicle sliding sideways (in its lateral direction) and engaging a tripping surface on a roadway creates a scenario that requires an advance determination of an anticipated vehicle rollover, such that the restraint devices may need to be deployed quickly. In this scenario, the tripping device, such as a curb, may suddenly cause the vehicle to quickly rollover such that a quick determination of an anticipated vehicle rollover may be desirable even when the vehicle roll angle is less than five degrees (5°), for example.

One technique for sensing a vehicle overturn condition is disclosed in U.S. Pat. No. 6,038,495, entitled "VEHICLE ROLLOVER SENSING USING SHORT-TERM INTEGRATION," the entire disclosure of which is hereby incorporated herein by reference. This technique employs an angular rate sensor for sensing roll rate of the vehicle. The sensed angular rate signal is integrated to produce an estimated current attitude angle, which is processed along with the sensed rate signal to predict a future roll angle. The predicted roll angle is compared to a threshold value to generate a deployment signal such that restraint devices may be deployed in response to the output signal.

While the aforementioned approach is generally well-suited for anticipating an overturn condition of the vehicle, a number of drawbacks still exist. For instance, angular rate sensors tend to be relatively complex and expensive. Additionally, in order to provide an acceleration value, the sensed rate signal must be differentiated, which generally is inherently error-prone.

It is therefore desirable to provide for a vehicle rollover sensing apparatus that may quickly predict an upcoming vehicle rollover. It is also desirable to provide for a cost effective vehicle roll sensing apparatus that accurately predicts a roll angle. It is further desirable to provide for a vehicle rollover sensing apparatus that may quickly predict an anticipated vehicle rollover condition, far enough in advance to deploy restraint device(s) in certain driving scenarios.

SUMMARY OF THE INVENTION

In accordance with the teachings of the present invention, a vehicle rollover sensing apparatus and method are provided for predicting an overturn condition of a vehicle. According to one aspect of the present invention, the apparatus includes an angular accelerometer for sensing angular acceleration of a vehicle and producing an output signal indicative thereof. The apparatus has an integrator for integrating the sensed angular acceleration signal and producing an angular rate. The apparatus also includes a predictor for predicting a future roll angle as a function of the sensed angular acceleration, the angular rate and a current roll angle. The apparatus further has a comparator for comparing the predicted future roll angle to a threshold value, and an output for generating a vehicle overturn condition signal based on the comparison.

According to another aspect of the present invention, a vehicle roll angle estimation apparatus and method are provided for estimating a roll angle of the vehicle. The apparatus includes an angular accelerometer for sensing acceleration of a vehicle and producing an output signal indicative thereof. The apparatus has an integrator for integrating the sensed angular acceleration signal and producing an angular rate. The apparatus further includes a predictor for predicting a future roll angle as a function of the sensed angular acceleration, the angular rate, and a current roll angle.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
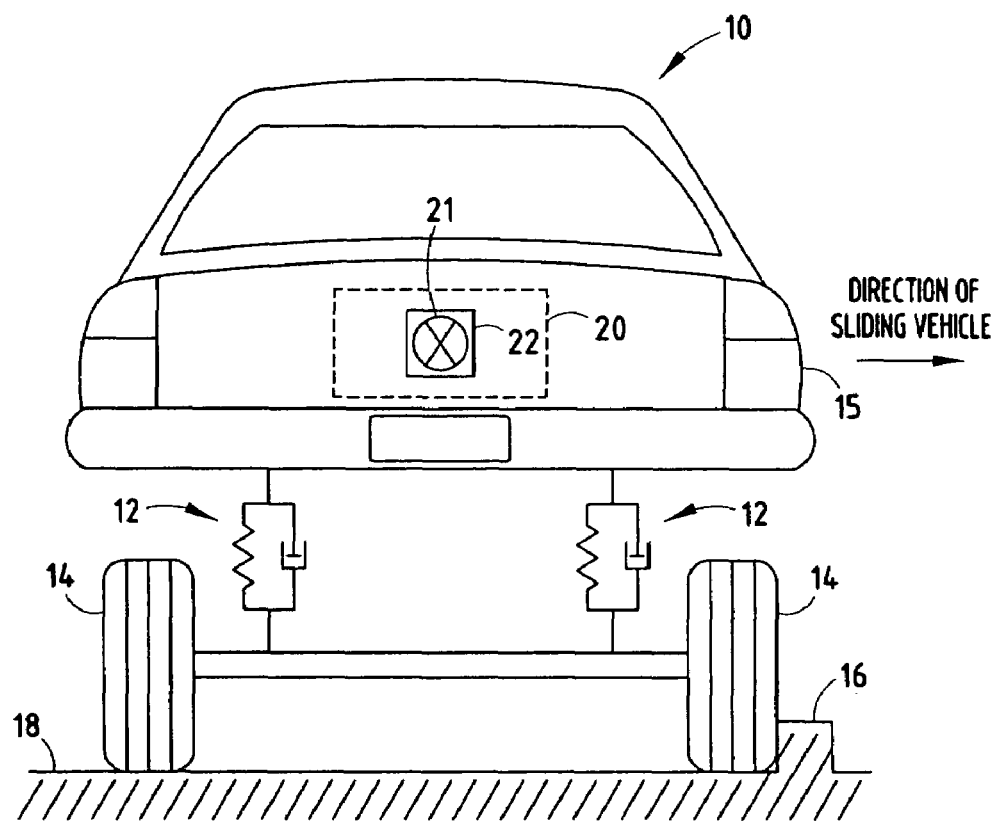
FIG. 1 is a front view of a vehicle engaging a road barrier while sliding sideways at a ninety degree (90°) yaw.

Referring to FIG. 1, a vehicle 10 is generally illustrated in one example of a rollover scenario in which the vehicle 10 experiences a ninety degree (90°) yaw such that the vehicle 10 slides sideways and strikes an upstanding rigid barrier 16 on the roadway 18. The vehicle 10 is generally illustrated having a rigid frame 15 connected to road wheels 14 via a suspension system 12. The vehicle 10 further includes a rollover sensing module 20 having an angular accelerometer 22, according to the present invention.

In this potential vehicle rollover scenario, the vehicle 10 is sliding at a yaw angle of 90°, and thus is moving in a lateral direction relative to the longitudinal axis of travel of the vehicle 10. As the road wheels 14 engage the rigid barrier 16, such as a curb on roadway 18, below the center of mass 21 of the vehicle 10, the vehicle 10 may be caused to rollover. Under such conditions, the barrier 16 can induce a tripping mechanism whereby the wheels 14 or undercarriage of the vehicle 10 becomes impeded, while the bulk of the vehicle 10 can continue movement. Depending on the geometry of such a collision and the speed and moment of inertia of the vehicle 10, the vehicle 10 may be caused to rollover.

When the wheels and suspension of the vehicle 10 become substantially stopped, at least momentarily, the rigid body 15 of the vehicle 10 will tend to continue in the direction of motion, at least momentarily. The momentum of the vehicle body 15 will exert a moment arm on the center of gravity (CG) or center of mass 21 of the vehicle body 15, with the pivot point being the point of contact between the barrier engaged wheel 14 and the barrier 16. If the vehicle body 15 continues unimpeded, and has sufficient energy, the entire vehicle 10 will tend to rotate about the barrier 16. As the vehicle body 15 rolls and continues moving, the wheels 14 and suspension 12 may be pulled along, and the entire vehicle 10 may experience an increase in the roll angle. If the energy and geometry are sufficient, the vehicle 10 can pass through the static-stability angle (i.e., the point at which the vehicle 10 just balances on two wheels), and may rollover.

The rollover sensing module 20 is employed to predict a future roll angle and to predict an anticipated rollover of the vehicle. The rollover sensing module 20 senses angular acceleration and processes the sensed angular acceleration in a manner that quickly predicts a future roll angle and anticipated rollover condition, and further allows for timely deployment of restraint devices on the vehicle 10, according to the present invention.

Figure 2:
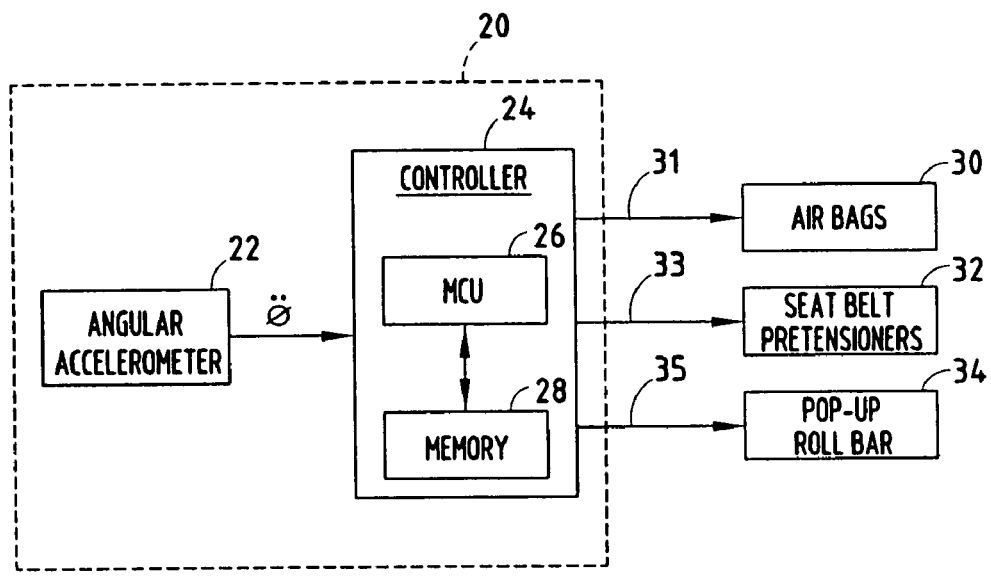
FIG. 2 is a block diagram of a rollover sensing module for sensing vehicle rollover according to the present invention.

Referring to FIG. 2, the rollover sensing module 20 is shown providing deployment signals 31, 33, and 35 to a number of restraint devices in the vehicle 10. These restraint devices include air bags 30, seatbelt pretensions 32, and pop-up roll bar 34. In order to minimize injury to occupants within the vehicle, these and other restraint devices should be deployed sufficiently early in time, prior to the completed rollover of the vehicle 10. The rollover sensing module 20 of the present invention advantageously anticipates a future roll angle φ at a time in the future and quickly determines the need for a deployment signal.

The rollover sensing module 20 is illustrated for use in sensing roll angular acceleration of the vehicle 10 and predicting a rollover condition of the vehicle 10. The rollover sensing module 20 is mounted on the automotive vehicle 10 and used to predict in advance a future rollover condition of the vehicle 10. A vehicle rollover condition, as described herein in connection with the present invention may include side-to-side rotation of the vehicle 10 about the vehicle's longitudinal axis, commonly referred to as a "vehicle rollover," and back-to-front rotation about the vehicle's lateral axis, commonly referred to as a "vehicle pitchover," or a combination of rollover and pitchover. For purposes of describing the rollover sensing of the present invention, the term "rollover" is generally used to refer to either a rollover condition or a pitchover condition.

The rollover sensing module 20 is designed to be located on the vehicle 10 to sense vehicle dynamics, particularly angular acceleration of the vehicle about an axis. Upon detecting a vehicle rollover condition, the rollover sensing module 20 provides output signals 31, 33, and 35 responsive to the predicted rollover condition. The rollover condition output signals 31, 33, and 35 may be supplied to one or more restraint devices, such as air bags 30, seatbelt pretensioners 32, and pop-up roll bar 34, to actuate one or more of the restraint devices in anticipation of an anticipated rollover. These and other restraint devices may be controlled in response to predicting an anticipated rollover condition.

The rollover sensing module 20 includes an angular accelerometer 22 oriented to sense angular acceleration about an axis. The angular accelerometer 22 measures angular acceleration about the vehicle's longitudinal axis, according to a first embodiment. According to a second embodiment, the angular accelerometer 22 may be oriented to measure angular pitch acceleration about the vehicle's lateral axis.

The rollover sensing module 20 further includes a controller 24 for processing the sensed angular acceleration and providing deployment signals to one or more restraint devices. The controller 24 includes a microprocessor control unit (MCU) 26. MCU 26 is preferably a microprocessor-based controller and, according to one example, may include Model No. HC12 commercially available from Motorola. The controller 24 further includes memory, such as electrically erasable programmable read-only memory (EEPROM) 28 that stores various program calibrations for performing the rollover sensing algorithm, as explained herein. The memory 28 can be integrated within the MCU 26 or provided external thereto.

The controller 24 processes the angular acceleration signal $\ddot{\phi}$ and one or more algorithms to integrate the sensed acceleration signal and to integrate the integrated angular rate. The controller 24 also predicts a future roll angle φ, and generates a vehicle rollover condition signal. The controller 24 further deploys one or more restraint devices upon detecting an expected rollover condition.

Figure 3:
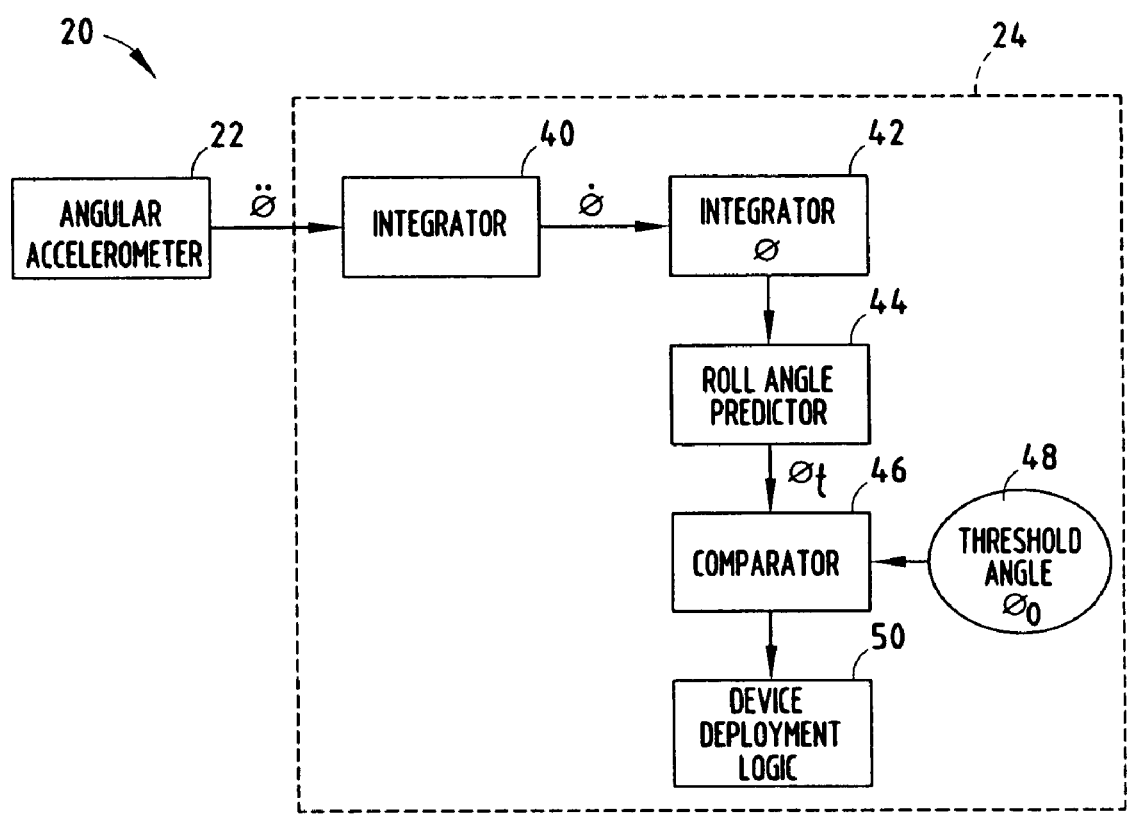
FIG. 3 is a block diagram illustrating a rollover sensing algorithm for predicting vehicle rollover with the rollover sensing module according to the present invention.

As shown in FIG. 3, the controller 24 includes a first integrator 40 for integrating the sensed angular acceleration signal $\ddot{\phi}$. The first integrator 40 may be implemented in software by an algorithm stored in memory 28 to perform a numerical integration that is based on current and previous time steps. The first integrator 40 generates as its output the angular rate $\dot{\phi}$, which is a series of angular rates. The series of angular rate values may be saved in memory, and may be downsampled. Downsampling of the angular rate allows for further signal processing to be performed at a slower sample rate, thereby consuming less microprocessor resources. The first integrator 40 may also be implemented as an analog electrical circuit, providing an angular rate signal which is continuously variable in time. This analog signal may be processed directly, or sampled discretely for further signal processing using methods well-known to those skilled in the art.

The controller also has a second integrator 42 that integrates the angular roll rate $\dot{\phi}$ output from the first integrator 40 to generate a current roll angle $\phi$. The second integrator 42 may be implemented as an analog electrical circuit or a finite difference numerical integration implemented via the MCU 28.

The controller 24 includes a roll angle predictor 44 for predicting a future roll angle $\phi$ of the vehicle 10 at a time in the future. The roll angle predictor 44 may include a Taylor-series predictor for generating as its output a quadratic extrapolation of the expected future roll angle $\phi$ of the vehicle 10.

The controller 24 further includes a comparator 46. The predicted future angle is compared to a threshold angle $\phi$ stored in block 48 via comparator 46. According to one embodiment, the threshold angle $\phi_o$ may include a vehicle roll angle of 50°. The deployment threshold angle $\phi_o$ may be a programmed predetermined threshold value that is used to determine the prediction of a rollover condition that is specific to the type of vehicle. When the predicted future roll angle $\phi$ exceeds the threshold angle $\phi_o$, the controller 24 initiates deployment of one or more restraint devices in deployment logic 50.

Figure 4:
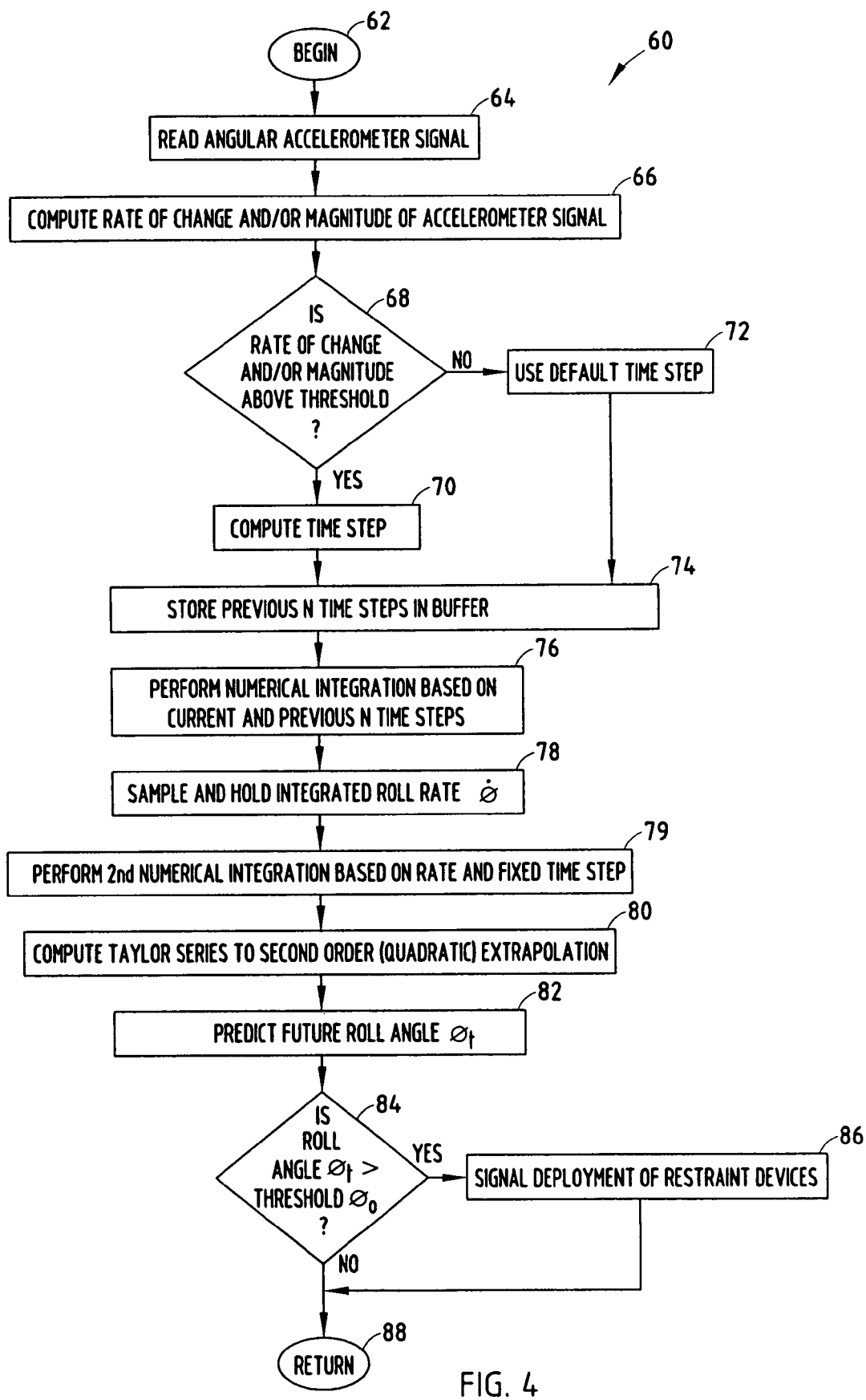
FIG. 4 is a flow diagram illustrating a methodology for sensing a rollover condition of a vehicle according to the present invention.

Referring to FIG. 4, a rollover prediction methodology 60 is shown for predicting a future attitude (e.g., roll) angle $\phi$ of the vehicle, predicting a vehicle rollover condition, and deploying one or more restraint devices in response thereto. The rollover prediction methodology 60 begins at step 62 and proceeds to read the angular accelerometer signal in step 64. In step 66, methodology 60 computes a rate of change of the accelerometer signal and/or a magnitude of the acceleration signal. In decision step 68, methodology 60 determines if the rate of change of the acceleration signal and/or magnitude of the acceleration signal is above a threshold and, if not, uses a default time step in step 72. If the rate of change of the acceleration signal and/or magnitude of the acceleration signal is above the threshold value, methodology 60 proceeds to step 70 to compute a new time step. The time step is the incremental time period of the integration.

Proceeding to step 74, methodology 60 stores the previous N number of time steps in buffer memory. Next, in step 76, methodology 60 performs a numerical integration of the acceleration signal $\ddot{\phi}$ based on the current and previous N time steps. The numerical integration generates a roll rate $\dot{\phi}$ which is sampled and held in step 78. The roll rate $\dot{\phi}$ is further integrated in step 79 to generate the current roll angle $\phi$.

Methodology 60 proceeds to step 80 to compute a Taylor-series to second order (quadratic) extrapolation. The Taylor-series computation may be performed according to the equation shown in FIG. 5. The Taylor-series extrapolation enables the prediction of a future roll angle $\phi_1$ at a fixed time t in the future which occurs in step 82. Methodology 60 compares the predicted future roll angle $\phi_1$ at a fixed time t in the future to a threshold angle $\phi_o$, such as 50°, in step 84. If the predicted future roll angle $\phi_1$ exceeds the threshold angle $\phi_o$, methodology 60 signals deployment of one or more restraint devices in step 86, before returning in step 88. If the predicted future roll angle $\phi$ does not exceed the threshold angle $\phi_o$, routine 60 returns in step 88, without deploying any restraint devices.

Figure 5:
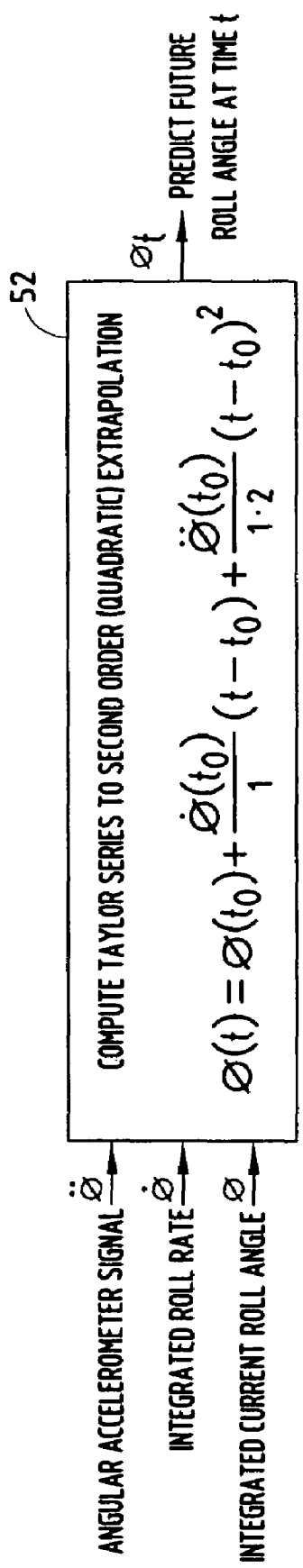
FIG. 5 is a block diagram illustrating the prediction of a future roll angle with a quadratic Taylor-series predictor.
Figure 6:
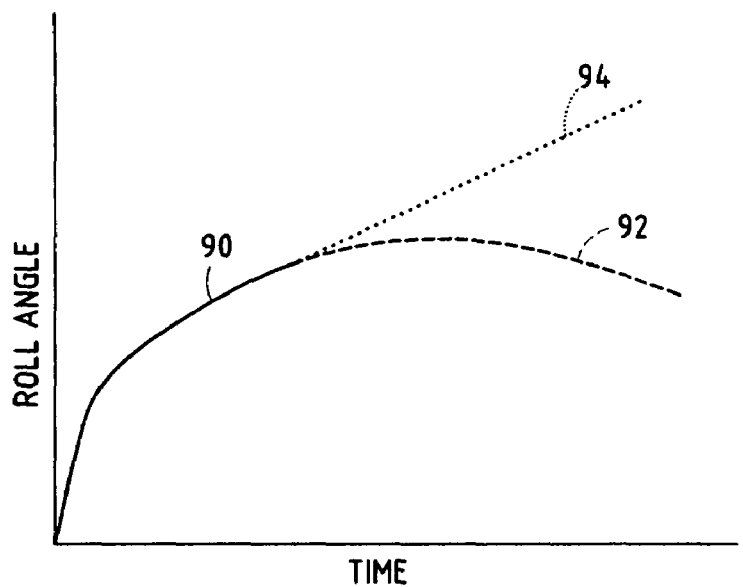
FIG. 6 is a graph illustrating the prediction of roll angle $\phi$ as a function of time, using a quadratic extrapolation achieved with the Taylor-series predictor.

The Taylor-series computation is further shown in FIGS. 5 and 6. By employing a quadratic Taylor-series equation, a quadratic extrapolation of the roll angle $\phi_1$ of the vehicle 10 may be determined at a future time t as shown by dashed line 92. This is in contrast to the past vehicle roll angle shown by line 90 and a linear extrapolation of the roll angle which would provide an expected linear response along dotted line 94. By employing a quadratic extrapolation, a more accurate prediction of the future roll angle $\phi$ may be achieved earlier on.

Figure 7:
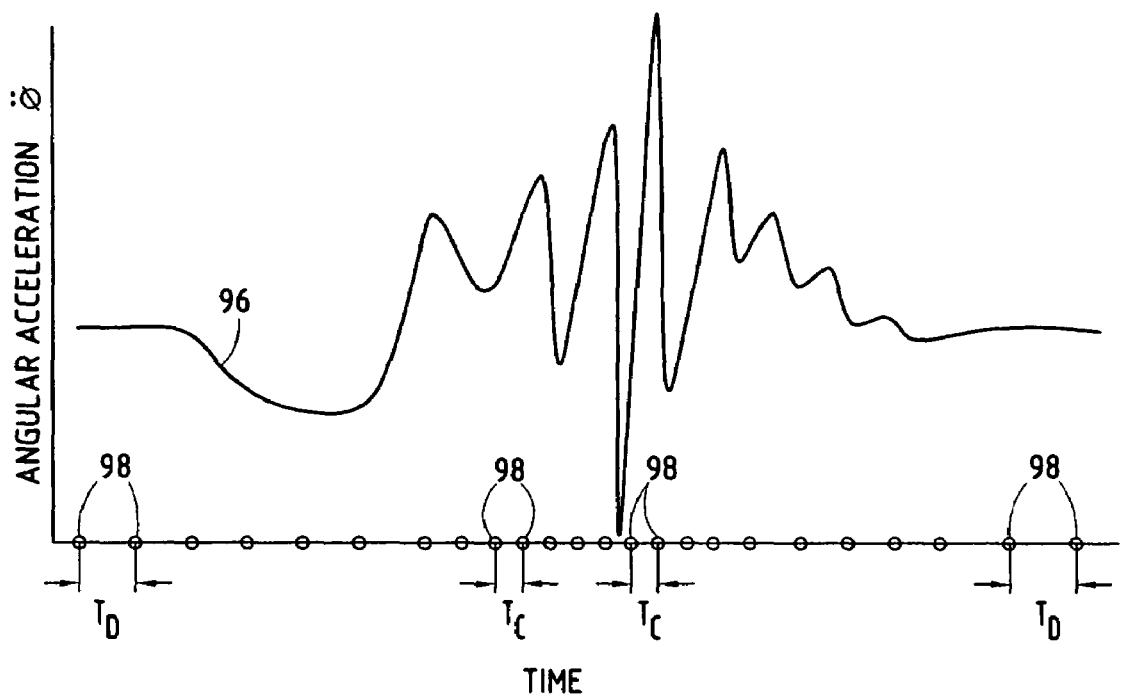
FIG. 7 is a graph illustrating the sensed angular acceleration as a function of time and adaptive time steps.

Referring to FIG. 7, the time steps 98 are shown for a sensed angular acceleration signal 96. If the rate of change of the angular acceleration signal 96 is below a threshold value, a default time step $T_D$ is employed. If the rate of change of the angular acceleration signal 96 exceeds a threshold value, a new computed time step $T_C$ is employed in the numerical integration. According to one embodiment, the time step $T_C$ is computed such that the time step $T_C$ is reduced if the rate of change of the acceleration signal is high so as to achieve greater accuracy in the integration. According to another embodiment, the time step $T_C$ may be adjusted as a function of the magnitude of the acceleration signal. This is achieved by comparing the absolute magnitude of the acceleration signal $\ddot{\phi}$ to a threshold value, and if it exceeds the threshold value, the time step $T_C$ is reduced. According to a further embodiment, simultaneous use of the rate of change of the acceleration $\ddot{\phi}$ and the magnitude of the acceleration $\ddot{\phi}$ may be used to provide accurate control of the integration time step $T_C$ so as to minimize integration errors while consuming a minimum of microprocessor resources.

Accordingly, the rollover sensing module 20 and method of the present invention advantageously predicts a future roll angle $\phi$ of the vehicle 10, and deploys one or more restraint devices in a timely fashion. Thus, the rollover sensing module 20 of the present invention enables early decisions with high confidence through increased accuracy of extrapolated vehicle rotation by employing an angular accelerometer 22 as described herein. The rollover sensing module 20 may provide deployment decisions early in a rollover event, such as when the current vehicle roll angle $\phi$ is less than 5°, by extrapolating the dynamic characteristics of the vehicle 10. It should be appreciated that by employing the angular accelerometer 22, increased accuracy of the extrapolation is achieved with the rollover sensing module 20.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A roll angle estimation apparatus for predicting a future roll angle of a vehicle, said apparatus comprising:
   an angular accelerometer for sensing angular acceleration of a vehicle and producing an output signal indicative thereof;
   an integrator for integrating the sensed angular acceleration signal and producing an angular rate; and
   a predictor for predicting a future roll angle of the vehicle as a function of the sensed angular acceleration, the angular rate, and a current roll angle.

2. The apparatus as defined in claim 1, wherein the current roll angle is determined by integrating the angular rate.

3. The apparatus as defined in claim 2, wherein the predictor comprises a Taylor series-based predictor for predicting the future roll angle as a quadratic extrapolation.

4. The apparatus as defined in claim 1, wherein the angular accelerometer senses roll angular acceleration about a longitudinal axis of the vehicle, and said predictor predicts the future roll angle about the longitudinal axis.

5. The apparatus as defined in claim 1, wherein said integrator and predictor are performed by a controller.

6. The apparatus as defined in claim 5, wherein said controller further compares the predicted future roll angle to a threshold value and predicts an anticipated vehicle overturn condition based on the comparison.

7. The apparatus as defined in claim 1, wherein the predictor performs a quadratic extrapolation.

8. The apparatus as defined in claim 1, wherein the integrator performs a numerical integration of the angular acceleration signal based on time steps that vary as a function of rate of change of the acceleration signal.

9. The apparatus as defined in claim 1, wherein the integrator performs a numerical integration of the angular acceleration signal based on time steps that vary as a function of magnitude of the acceleration signal.

10. A rollover sensing apparatus for predicting an overturn condition for a vehicle, comprising:
   an angular accelerometer for sensing angular acceleration of a vehicle and producing an output signal indicative thereof;
   an integrator for integrating the sensed angular acceleration signal and producing an angular rate;
   a predictor for predicting a future roll angle of the vehicle as a function of the sensed angular acceleration, the angular rate, and a current roll angle;
   a comparator for comparing the predicted future roll angle to a threshold value; and
   an output for generating an output signal indicative of an anticipated vehicle overturn condition prediction based on said comparison.

11. The apparatus as defined in claim 10, wherein the current roll angle is determined by integrating the angular rate.

12. The apparatus as defined in claim 11, wherein the predictor comprises a Taylor series-based predictor for predicting the future roll angle as a quadratic extrapolation.

13. The apparatus as defined in claim 10, wherein the angular accelerometer senses roll angular acceleration about a longitudinal axis of the vehicle, and said predictor predicts the future roll angle about the longitudinal axis.

14. The apparatus as defined in claim 10, wherein said integrator, predictor, and comparator are performed by a controller.

15. The apparatus as defined in claim 10, wherein the predictor performs a quadratic extrapolation.

16. The apparatus as defined in claim 10, wherein the integrator performs a numerical integration of the angular acceleration signal based on time steps that vary as a function of rate of change of the acceleration signal.

17. The apparatus as defined in claim 10, wherein the integrator performs a numerical integration of the angular acceleration signal based on time steps that vary as a function of magnitude of the acceleration signal.

18. A method for estimating a future roll angle of a vehicle, said method comprising the steps of:
   sensing angular acceleration of a vehicle and producing an output signal indicative thereof;
   integrating the sensed angular acceleration signal to generate an angular rate;
   obtaining a current roll angle;
   predicting a future roll angle as a function of the sensed angular acceleration, the angular rate, and the current roll angle.

19. The method as defined in claim 18, wherein the step of obtaining the current roll angle comprises integrating the angular rate.

20. The method as defined in claim 18 further comprising the steps of:
   comparing the predicted future roll angle to a threshold value; and
   generating a vehicle overturn condition signal based on said comparison.

21. The method as defined in claim 18, wherein said step of integrating comprises:
   determining a rate of change of the acceleration signal;
   computing a time step as a function of the rate of change of the acceleration signal; and
   performing numerical integration of the acceleration signal based on the computed time step.

22. The method as defined in claim 18, wherein the step of integrating comprises:
   determining a magnitude of the acceleration signal;
   computing a time step as a function of magnitude of the acceleration signal; and
   performing numerical integration of the acceleration signal based on the computed time step.

23. The method as defined in claim 18, wherein the step of sensing angular acceleration comprises sensing roll angular acceleration about a longitudinal axis of the vehicle.

24. The method as defined in claim 18, wherein the step of predicting a future roll angle comprises computing a Taylor-series quadratic function.

25. A method for predicting an overturn condition of a vehicle, said method comprising the steps of:
   sensing angular acceleration of a vehicle and producing an output signal indicative thereof;
   integrating the sensed angular acceleration signal and producing an angular rate;
   obtaining a current roll angle;
   predicting a future roll angle as a function of said sensed angular acceleration, said angular rate, and said current roll angle;
   comparing the predicted future roll angle to a threshold value; and
   generating a vehicle overturn condition signal based on said comparison.

26. The method as defined in claim 25, wherein the step of obtaining the current roll angle comprises integrating the angular rate.

27. The method as defined in claim 25 further comprising the steps of:
   comparing the predicted future roll angle to a threshold value; and
   deploying a vehicle overturn condition based on said comparison.

28. The method as defined in claim 25, wherein said step of integrating comprises:
   determining a rate of change of the acceleration signal;
   computing a time step as a function of the rate of change; and
   performing numerical integration of the acceleration signal based on the computed time step.

29. The method as defined in claim 25, wherein the step of integrating comprises:
   determining a magnitude of the acceleration signal;
   computing a time step as a function of magnitude of the acceleration signal; and
   performing numerical integration of the acceleration signal based on the computed time step.

30. The method as defined in claim 25, wherein the step of sensing angular acceleration comprises sensing roll angular acceleration about a longitudinal axis of the vehicle.

31. The method as defined in claim 25, wherein the step of predicting a future attitude angle comprises computing a Taylor-series quadratic function.

* * * * *